United States Patent
Byrne et al.

(10) Patent No.: US 10,764,295 B2
(45) Date of Patent: Sep. 1, 2020

(54) MONITORING SERVICE POLICY MANAGEMENT

(71) Applicant: International Business Machines Corporation, Armonk, NY (US)

(72) Inventors: Alan Byrne, Mulhuddart (IE); Bryan D. Osenbach, Cary, NC (US); Paul Connolly, Castleknock (IE)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 15/671,504

(22) Filed: Aug. 8, 2017

(65) Prior Publication Data
US 2019/0052641 A1 Feb. 14, 2019

(51) Int. Cl.
*H04L 29/06* (2006.01)
*H04L 12/26* (2006.01)
*H04L 12/24* (2006.01)
*H04W 12/08* (2009.01)

(52) U.S. Cl.
CPC ........ *H04L 63/101* (2013.01); *H04L 41/0893* (2013.01); *H04L 43/08* (2013.01); *H04L 63/104* (2013.01); *H04L 63/105* (2013.01); *H04L 63/1416* (2013.01); *H04L 63/20* (2013.01); *H04W 12/08* (2013.01)

(58) Field of Classification Search
None
See application file for complete search history.

(56) References Cited

U.S. PATENT DOCUMENTS

| | | | |
|---|---|---|---|
| 6,609,083 B2 | 8/2003 | Enck et al. | |
| 6,675,128 B1 | 1/2004 | Hellerstein | |
| 7,802,144 B2 | 9/2010 | Vinberg et al. | |
| 8,086,708 B2 | 12/2011 | Breitgand et al. | |
| 9,246,945 B2 * | 1/2016 | Chari | H04L 63/20 |
| 9,411,702 B2 | 8/2016 | Eilam et al. | |
| 9,519,513 B2 | 12/2016 | Zada et al. | |
| 9,591,074 B2 | 3/2017 | Benedetti et al. | |
| 9,654,510 B1 * | 5/2017 | Pillai | H04L 63/1416 |

(Continued)

OTHER PUBLICATIONS

Cisco, "Monitor Device and Network Health and Performance," Cisco Evolved Programmable Network Manager 1.1 User and Administrator Guide, Limited Orderability Release, Chapter 7, printed Jul. 31, 2017, 14 pages.

(Continued)

*Primary Examiner* — Kambiz Zand
*Assistant Examiner* — Arezoo Sherkat
(74) *Attorney, Agent, or Firm* — Mark Bergner

(57) ABSTRACT

The present invention provides a computer implemented method, a system, and a computer program product of monitoring service policy management. In an exemplary embodiment, the computer implemented method, the system, and the computer program product include (1) receiving, by a computer system, a user-id when a new user logs onto a target network, (2) in response to the receiving, fetching, by the computer system, a rule associated with the new user, and (3) replacing, by the computer system, an active rule in a network monitoring service with the fetched rule such that the network monitoring service is configured to use the fetched rule, instead of the replaced active rule, for monitoring network events and creating an alert.

15 Claims, 15 Drawing Sheets

(56) References Cited

U.S. PATENT DOCUMENTS

| | | | |
|---|---|---|---|
| 10,122,757 B1* | 11/2018 | Kruse | H04L 63/10 |
| 2007/0005297 A1 | 1/2007 | Beresniewicz et al. | |
| 2009/0313623 A1 | 12/2009 | Coskun et al. | |
| 2010/0070319 A1 | 3/2010 | Prafullchandra et al. | |
| 2012/0011517 A1 | 1/2012 | Smith et al. | |
| 2012/0096065 A1 | 4/2012 | Suit et al. | |
| 2014/0059641 A1* | 2/2014 | Chapman, II | G06F 21/554 |
| | | | 726/1 |
| 2014/0098671 A1* | 4/2014 | Raleigh | H04L 69/14 |
| | | | 370/235 |
| 2015/0172321 A1* | 6/2015 | Kirti | H04L 63/20 |
| | | | 726/1 |
| 2015/0269383 A1* | 9/2015 | Lang | G06F 21/57 |
| | | | 726/1 |
| 2016/0210578 A1* | 7/2016 | Raleigh | G06Q 10/06375 |
| 2017/0054598 A1* | 2/2017 | Adam | H04L 41/5054 |
| 2018/0027006 A1* | 1/2018 | Zimmermann | H04L 63/0227 |
| | | | 726/11 |
| 2018/0084012 A1* | 3/2018 | Joseph | H04L 63/1425 |
| 2018/0109386 A1* | 4/2018 | Khan | G06Q 20/3825 |
| 2018/0167407 A1* | 6/2018 | Ikeda | H04L 63/1425 |
| 2018/0246911 A1* | 8/2018 | Lee | G06F 16/21 |
| 2018/0288063 A1* | 10/2018 | Koottayi | G06F 21/552 |
| 2018/0375886 A1* | 12/2018 | Kirti | H04L 63/1425 |

OTHER PUBLICATIONS

Mell, et al., "The NIST Definition of Cloud Computing," National Institute of Standards and Technology, U.S. Department of Commerce, Special Publication 800-145, Oct. 2011, 7 pages.

Kreibich, "Alerting for day to day changes with dynamic thresholds?" Tableau Community, Feb. 9, 2016, 3 pages.

Hui Liu et al., "Dynamic and Automatic Feedback-Based Threshold Adaptation for Code Smell Detection," IEEE Transactions on Software Engineering, vol. 42, Issue 6, Jun. 1, 2016, 20 pages DOI: 10.1109/TSE.2015.2503740.

* cited by examiner

| Primary policyP | Derived policyP1 |
|---|---|
| `"policy": {`<br>`  "clusters": ["clusterS", "clusterT"],`<br>`  "metrics": [`<br>`    {`<br>`      "ruleName": "cpuR",`<br>`    },`<br>`    {`<br>`      "ruleName": "nodeDownR",`<br>`    },`<br>`    ...`<br>`  ]`<br>`}` | `"policyP1": {`<br>`  "clusters": ["clusterS", "clusterT"],`<br>`  "metrics": [`<br>`    {`<br>`      "ruleName": "cpuR1",`<br>`    },`<br>`    {`<br>`      "ruleName": "nodeDownR1",`<br>`    },`<br>`    ...`<br>`  ]`<br>`}` |

FIG. 5A

| cpuR for Primary policyP | cpuR1 Rule for Derived policyP1 |
|---|---|
| "ruleName": "cpuR", <br> "metricScale": "server", <br> "metric": "cpu", <br> "alertCondition": <br> "greaterThan", <br> "alertValue": "85", <br> "relaxRule": { <br>   "operation": "subtract", <br>   "value": "35" <br> } | "ruleName": "cpuR1", <br> "metricScale": "server", <br> "metric": "cpu", <br> "alertCondition": <br> "greaterThan", <br> "alertValue": "50", <br> "relaxRule": { <br>   "operation": "subtract", <br>   "value": "35" <br> } |

FIG. 5B

| nodeDownR Rule for Primary policy | nodeDownR1 Rule for Derived policyP1 |
|---|---|
| "ruleName": "nodeDownR",<br>"metricScale": "cluster",<br>//This rule is applied to the cluster as a whole<br>"metric": "portTest",<br>"port": "8080",<br>"alertCondition":<br>"greaterThan",<br>"alertValue": "4",<br>// There are 4 servers in the cluster. All 4 must be responsive on the port<br>"relaxRule": {<br>"operation": "subtract",<br>"value": "1"<br>} | "ruleName": "nodeDownR1",<br>"metricScale": "cluster",<br>//This rule is applied to the cluster as a whole<br>"metric": "portTest",<br>"port": "8080",<br>"alertCondition":<br>"greaterThan",<br>"alertValue": "3",<br>// There are 4 servers in the cluster. 1 can be down<br>"relaxRule": {<br>"operation": "subtract",<br>"value": "1"<br>} |

FIG. 5C

Roles

```
"roles" :[
  "role1": {
    "members": ["john.smyth", "alvis.thompson"],
    "derivitivePolicies": [
      "policyP" : "policyP1",
      "policyQ" : "policyQ4",
      ...
    ]
  },
  ...
]
```

FIG. 5D

MONITORING SERVICE POLICY MANAGEMENT

BACKGROUND

The present disclosure relates to network monitoring systems, and more specifically, to monitoring service policy management.

SUMMARY

The present invention provides a computer implemented method, a system, and a computer program product of monitoring service policy management. In an exemplary embodiment, the computer implemented method, the system, and the computer program product include (1) receiving, by a computer system, a user-id when a new user logs onto a target network, (2) in response to the receiving, fetching, by the computer system, a rule associated with the new user, and (3) replacing, by the computer system, an active rule in a network monitoring service with the fetched rule such that the network monitoring service is configured to use the fetched rule, instead of the replaced active rule, for monitoring network events and creating an alert.

BRIEF DESCRIPTION OF THE DRAWINGS

FIG. 5A depicts policies in accordance with an embodiment of the present invention.

FIG. 5B depicts rules in accordance with an embodiment of the present invention.

FIG. 5C depicts rules in accordance with an embodiment of the present invention.

FIG. 5D depicts roles in accordance with an embodiment of the present invention.

DETAILED DESCRIPTION

The present invention provides a computer implemented method, a system, and a computer program product of monitoring service policy management. In an exemplary embodiment, the computer implemented method, the system, and the computer program product include (1) receiving, by a computer system, a user-id when a new user logs onto a target network, (2) in response to the receiving, fetching, by the computer system, a rule associated with the new user, and (3) replacing, by the computer system, an active rule in a network monitoring service with the fetched rule such that the network monitoring service is configured to use the fetched rule, instead of the replaced active rule, for monitoring network events and creating an alert.

A network monitoring system uses policies to decide how and what to monitor and when and who to alert. There is a need for a network monitoring system to update monitoring or alerting policies based on changing context and events. For example, in production cloud environments, systems need to be patched. Such patching could be disruptive to the health of an individual node for a short time, but not to the overall health of the cluster in which the node resides.

Figure 1A:
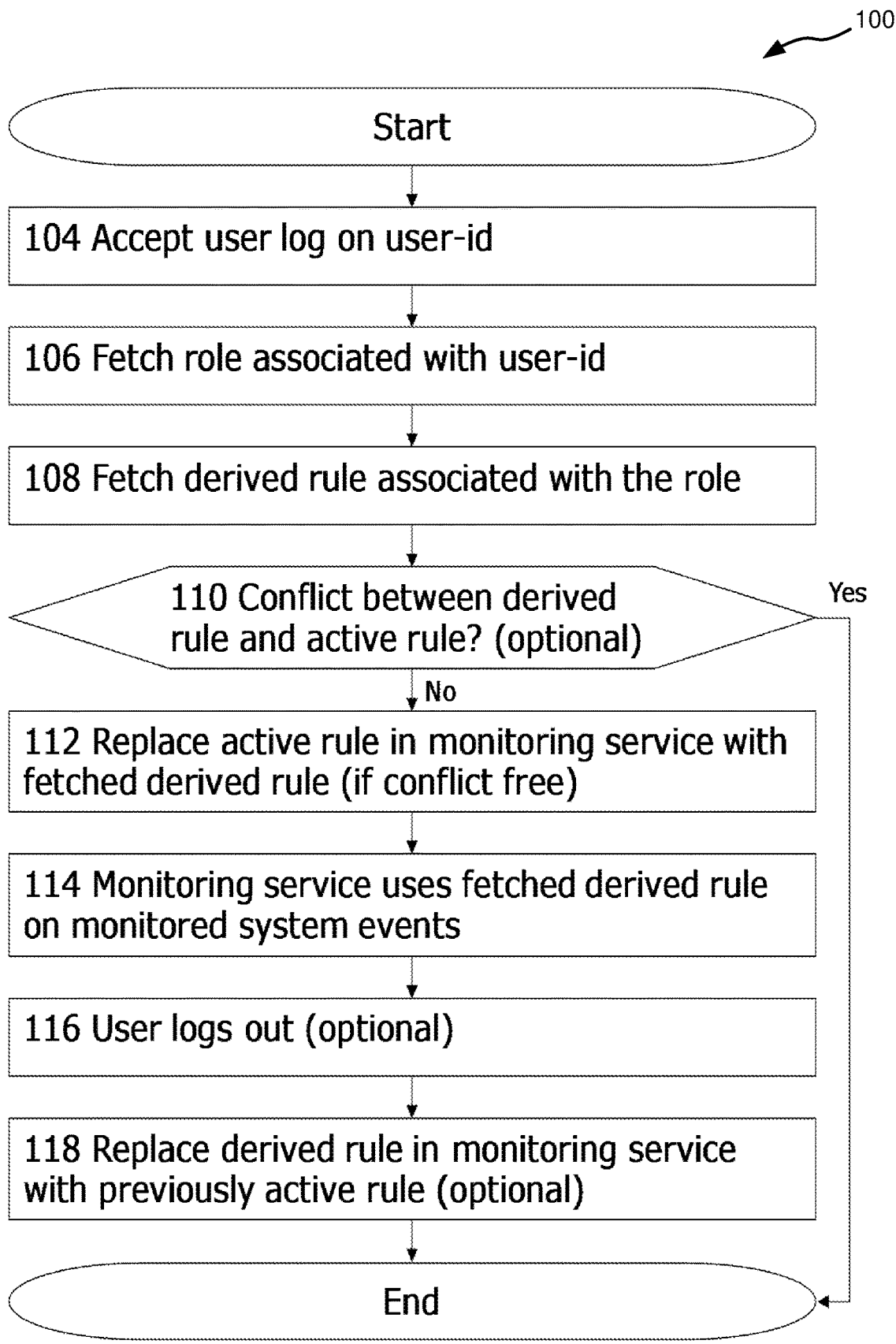
FIG. 1A depicts a flowchart in accordance with an exemplary embodiment of the present invention.

Referring to FIG. 1A, a flow diagram/flowchart of a team-based policy method 100 of the present embodiment is described. Team-based policy method 100 is for use in a network monitoring service, the network monitoring service for monitoring network events in a network according to one or more rules for creating an alert, the network allowing one or more users to be logged-on. Team-based policy method 100 includes logical process steps 104 to 118. Although there is an order to the embodiment steps as described, the steps do not need to be in this order unless specified. In other embodiments, the steps could be in a different order.

Figure 4:
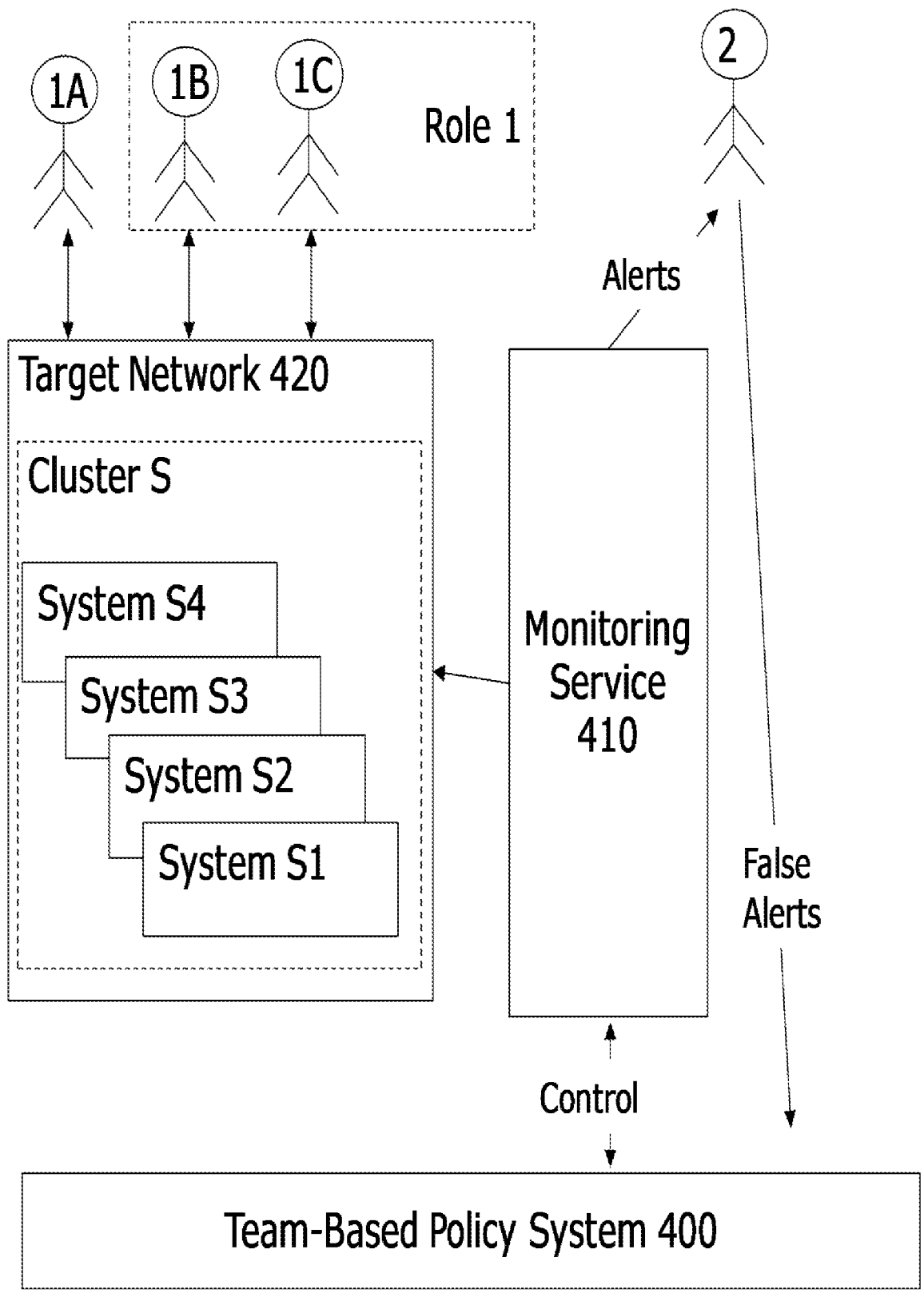
FIG. 4 depicts a block diagram in accordance with an embodiment of the present invention.

The present embodiment refers to a policy of rules. In other embodiments, a rule can include one or more sub-rules. Such a rule comprising sub-rules could also be described as a policy of rules. In the present embodiment, the user is associated with a role, and the rule or policy is associated with the role. In other embodiments, a rule or policy is directly associated with a user. Referring to FIG. 4, a target network 420 includes a plurality of network devices, and a rule could be applied to each network device or a cluster of network devices. A cluster of network devices refers to any group of devices.

Step 104 is for receiving a user-id when a new user logs onto target network 420. A new user log on is identified via log-on monitor 202. Step 106 is for fetching a role associated with the logged-on user-id. This step is an advanced (optional) step if the user is associated with a role. The team database 254 is used to identify user roles. Step 108 is for fetching a rule (or policy of rules) associated with the logged-on user (or a logged-on user role if rules are associated with roles). Rules are stored in policy database 252. Rule Fetcher 204 is used to carry out step 106. Depending on the situation, the rule could be a group of rules, and the group could be called a policy.

Step 110 is for ending the process/method if there is a conflict between the derived rule and the active rule in the case where the active rule is already a derived rule. This safety check is optional, and otherwise, the process/method continues at step 112. Such a conflict may occur when the active rule is already a first derived rule from a first user (or first team) and there is a proposed substitution for a second derived rule for a second user (or second team) whereby there is conflict between the first derived rule and the second derived rule. A policy for managing the conflict could choose different conflict resolutions depending on the rules and users, and such confliction resolutions could include (i) ending the substitution (as described in step 110), (ii) continuing the substitution, or (iii) reverting to the original active rule. The confliction resolutions may be defined in the rules, and the users or teams may be given priority over one another.

Step 112 is for replacing (via component 206) an active rule in the network monitoring service with the fetched user rule whereby the network monitoring service subsequently uses the user rule for monitoring network events and creating an alert instead of the previously active rule/replace active rule. Step 114 is where monitoring service 410 is instructed to use the fetched derived rule on monitored system events. Step 116 is for detecting that the logged-on user logs out (via log-on monitor 202), where step 116 is an optional step. Typically, a notification is received when the user logs out of the network. Step 118 is for replacing the derived rule in the monitoring service with previously active rule/replaced active rule (optional as with step 116). The previously active rule/replace active rule is fetched (from the policy database 252) and replaced whereby the monitoring service subsequently uses the previously active rule/fetched replaced active rule for monitoring network events instead of the user rule.

Figure 1B:
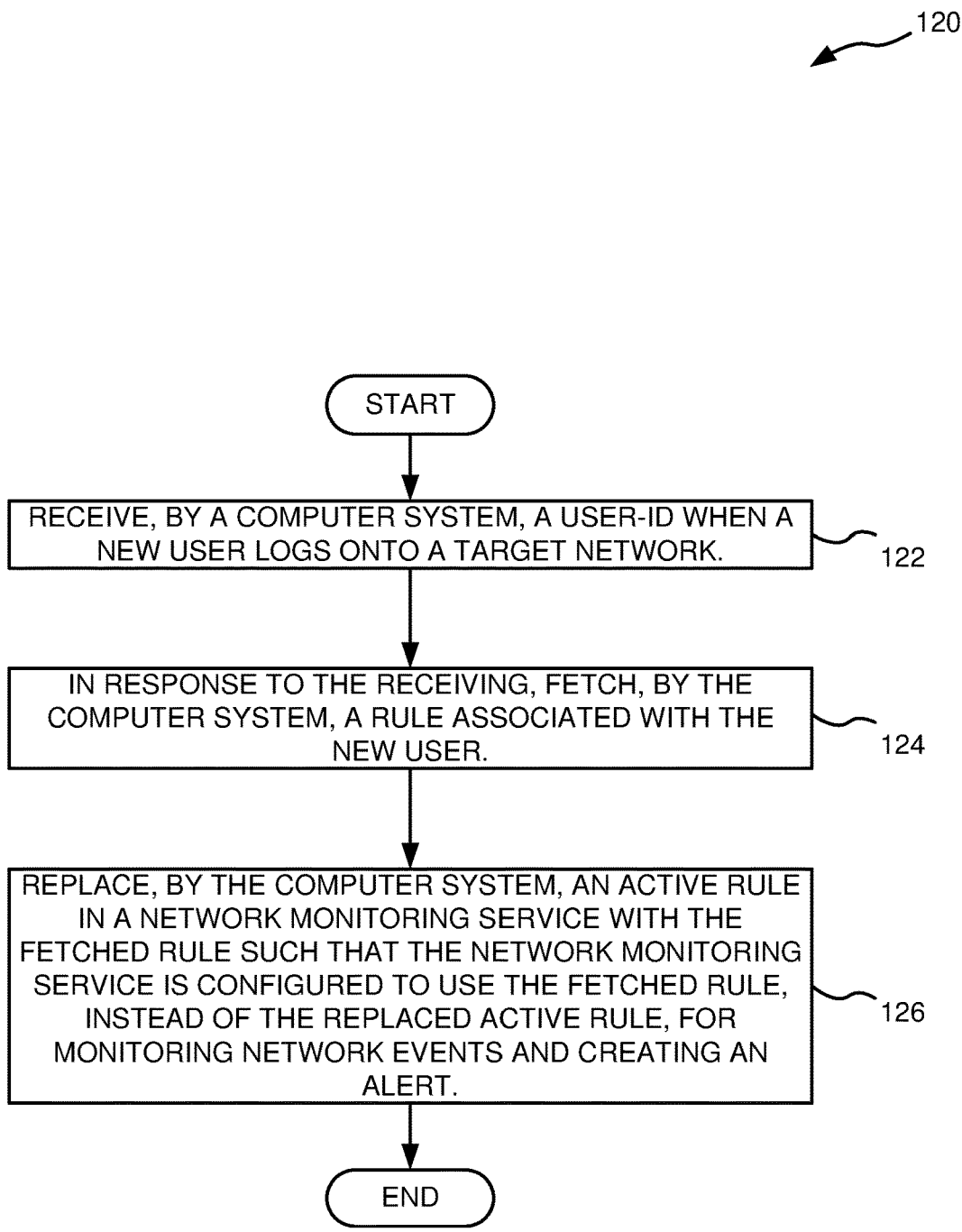
FIG. 1B depicts a flowchart in accordance with an exemplary embodiment of the present invention.

Referring to FIG. 1B, in an exemplary embodiment, the present invention is configured to perform an operation 122 of receiving, by a computer system, a user-id when a new user logs onto a target network, an operation 124 of in response to the receiving, fetching, by the computer system, a rule associated with the new user, and an operation 126 of replacing, by the computer system, an active rule in a network monitoring service with the fetched rule such that the network monitoring service is configured to use the fetched rule, instead of the replaced active rule, for monitoring network events and creating an alert.

In an exemplary embodiment, the computer implemented method, the system, and the computer program product include (1) receiving a user-id when a new user logs onto the network; fetching a rule associated with the logged-on user, (2) replacing an active rule in the network monitoring service with the user rule whereby the network monitoring service subsequently uses the fetched user rule, instead of using the previously active rule, for monitoring network events and for creating an alert, (3) receiving a false alert; associating the false alert, active rule and logged-on user as a possible trend; searching for similar possible trends having a similarly associated false alert, active rule and logged-on user, and (4) when two or more possible trends are located then creating new user rule or amending an existing user rule. In an embodiment, a policy may include one or more rules such that fetched and active rules may each form part of larger overall policies.

In an exemplary embodiment, the computer implemented method, the system, and the computer program product include (1) receiving a user-id when a new user logs onto the target network; fetching a rule associated with the logged-on user, and (2) replacing an active rule in the network monitoring service with the user rule whereby the network monitoring service subsequently uses the fetched user rule, instead of using the previously active rule, for monitoring network events and for creating an alert.

In an exemplary embodiment, the system includes (1) a log-on id monitor to receive a user-id when a new user logs onto the network, (2) a rule fetcher to fetch a rule associated with the logged-on user, and (3) a rule replacer to replace an active rule in the network monitoring service with the fetched user rule whereby the network monitoring service subsequently uses the user rule, instead of using the previously active rule, for monitoring network events and for creating an alert.

Embodiments of the present invention automatically apply updated rules when people job roles access the system in the future. For example, the embodiments observe users accessing one system to dynamically manage monitoring policies in a system and learn over time to better refine the monitoring policies. In another example, a monitoring service for a system alerts persons on failure of that system, requiring an operator to disable monitoring for that node for the duration of applying a patch or "acknowledge" a false alert to avoid others acting upon it. In another example, if a developer associated to a server were to log into a server, the present invention could identify that the developer is debugging and slightly relax resource consumption thresholds to account for developer activities.

In an embodiment, the present invention provides self-learning systems and methods that use historical analytics to derive the correct monitoring policies for computer systems to be automatically applied when users of a given job role access that computer system. For example, the present invention could handle scenarios where different people with different defined job roles, have defined categories of tasks such that such tasks would have different requirements around monitoring alerting. In a further example, the present invention could observe actions that accessing users take when logged into a computer system, and then refine the applied monitoring policies to match the users job role over time such that such a refined monitoring policy could be automatically applied when members of an associated job role access the computer system in the future. In an embodiment, the present invention could identify false alerting trends more easily than a user could, and could eliminate the need for an administrator to correctly derive and maintain over time how an alerting policy should differ for different teams and tasks. For example, the present invention could allow operator actions and processes to function independently from adjusting monitoring policies and false alerting.

Figure 2:
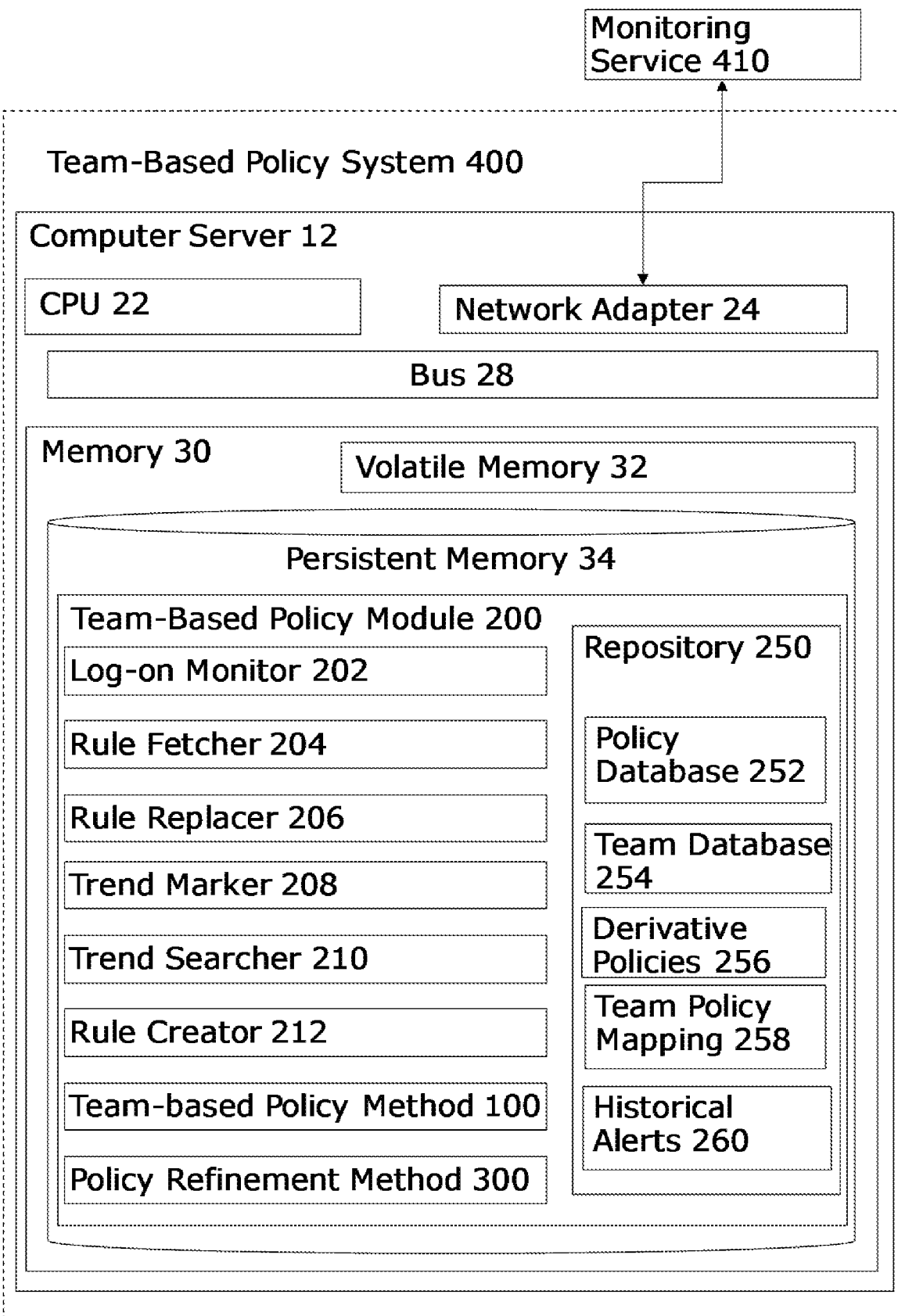
FIG. 2 depicts a block diagram in accordance with an exemplary embodiment of the present invention.

Referring to FIG. 2, the deployment of a team-based policy system 400 in a computer server 12 is described. Computer sever 12 is operational with numerous other general purpose or special purpose computing system environments or configurations. Examples of well-known computing processing systems, environments, and/or configurations that may be suitable for use with computer server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices. A distributed computer environment includes a cloud computing environment for example where a computer processing system is a third-party service performed by one or more of a plurality of computer processing systems. A distributed computer environment also includes an Internet of Things computing environment, for example, where computer processing systems are distributed as a network of objects that can interact with a computing service.

Computer server 12 may be described in the general context of computer system executable instructions, such as program modules, being executed by a computer processor. Generally, program modules may include routines, programs, objects, components, logic, and data structures that perform tasks or implement abstract data types. Computer server 12 may be embodied in distributed cloud computing environments where tasks are performed by remote processing devices that are linked through a communications network. In a distributed cloud computing environment, program modules may be located in both local and remote computer system storage media including memory storage devices. Computer server 12 is connected to monitoring service 110. Computer server 12 includes a central processing unit (CPU) 22, a network adapter 24, a device adapter 26, a bus 28, and a memory 30.

CPU 22 is for loading machine instructions from memory 30 and performing machine operations in response to the machine instructions. Such machine operations include performing an operation on a value in a register (for example arithmetical or logical operations), moving a value from a register to a memory location directly and vice versa, and conditional or non-conditional branching. A typical CPU can perform many different machine operations. The machine instructions are written in a machine code language which is referred to as a low-level computer language. A computer program written in a high-level computer language (also known as source code) needs to be compiled to a machine code program (also known as object code) before it can be executed by the processor. Alternatively, a machine code program such as a virtual machine or an interpreter can interpret a high-level language in terms of machine operations.

Network adapter 24 is for enabling communication between the computer server 12 and monitoring service 410. Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures.

Memory 30 includes computer system readable media in the form of volatile memory 32 and non-volatile or persistent memory 34. Examples of volatile memory 32 are random access memory (RAM) and cache memory. Examples of persistent memory 34 are read only memory (ROM) and erasable programmable read only memory (EPROM). Generally volatile memory is used because it is faster and generally non-volatile memory is used because it will hold the data for longer. Memory 30 includes team-based policy module 200 that is configured for monitoring network events in a network according to one or more rules for creating an alert.

In an exemplary embodiment, a team-based policy module 200 is loaded from the persistent memory 34, where it is stored, into volatile memory 32 for operation using CPU 22. In another embodiment, ROM in memory 30 stores the modules for enabling the computer server 12 to function as a special purpose computer specific to the module 200. Further program modules that support the preferred embodiment but are not shown include firmware, boot strap program, operating system, and support applications. Each of the operating system, support applications, other program modules, program data, or some combination thereof may include an implementation of a networking environment. In an embodiment, team-based policy module 200 includes a log-on monitor 202, a rule fetcher 204, a rule replacer 206, a trend marker 208, a trend searcher 210, a rule creator 212, a team-based policy method 310, a policy refinement method 300, and a repository 250.

In an embodiment, log-on monitor 202 receives a user-id when a new user logs onto the target network. In an embodiment, rule fetcher 204 fetches a rule associated with a logged-on user, where the rule could be a group of rules and the group could be called a policy. In an embodiment, rule replacer 206 replaces an active rule in the network monitoring service with the fetched user rule whereby the network monitoring service subsequently uses the user rule for monitoring network events and creating one or more alerts instead of the previously active rule. Again, the fetched rule could be a group of fetched rules, and the fetched group could be called a fetched policy. In an embodiment, trend marker 208 associates a false alert, an active rule, and a logged-on user as a possible trend (i.e., for indicating that the active rule is possibly generating a false alert for a particular user). In an embodiment, trend searcher 210 searches for a similarly associated false alert, active rule and logged-on user. In an embodiment, when two or more similarly associated false alerts are located, rule creator 212 creates a new user rule or amends an existing user rule.

In an exemplary embodiment, team-based policy method 100 co-ordinates a replacement of an active rule/policy with a derived rule/policy. For example, replacement of a rule/policy typically could occur when it is determined that the active rule is (in all likelihood) generating one or more false alerts for a user. The rule/policy could be replaced with a derived rule/policy which may specify relaxed criteria, less likely to generate such a false alert. In a further embodiment, policy refinement method 300 co-ordinates creation of a derived rule when a new trend is located.

In an embodiment, repository 250 is a data storage space for storing data and includes a policy database 252, a team database 254, derivative policies 256, team policy mappings 258, and historical alerts 260. In a particular embodiment, policy database 252 stores policies and rules. In a particular embodiment, team database 254 stores role definitions. In a particular embodiment, derivative policies 256 is a database that stores derivative policies. In a particular embodiment, team policy mappings 258 is a database that stores team policy mappings. In an embodiment, each team is associated or mapped to a policy or a single rule, and such an association or mapping is stored in team policy mappings 258. In a particular embodiment, historical alerts 260 stores all historical alerts, false alerts, possible false alert trends, and false alert trends.

Figure 7:
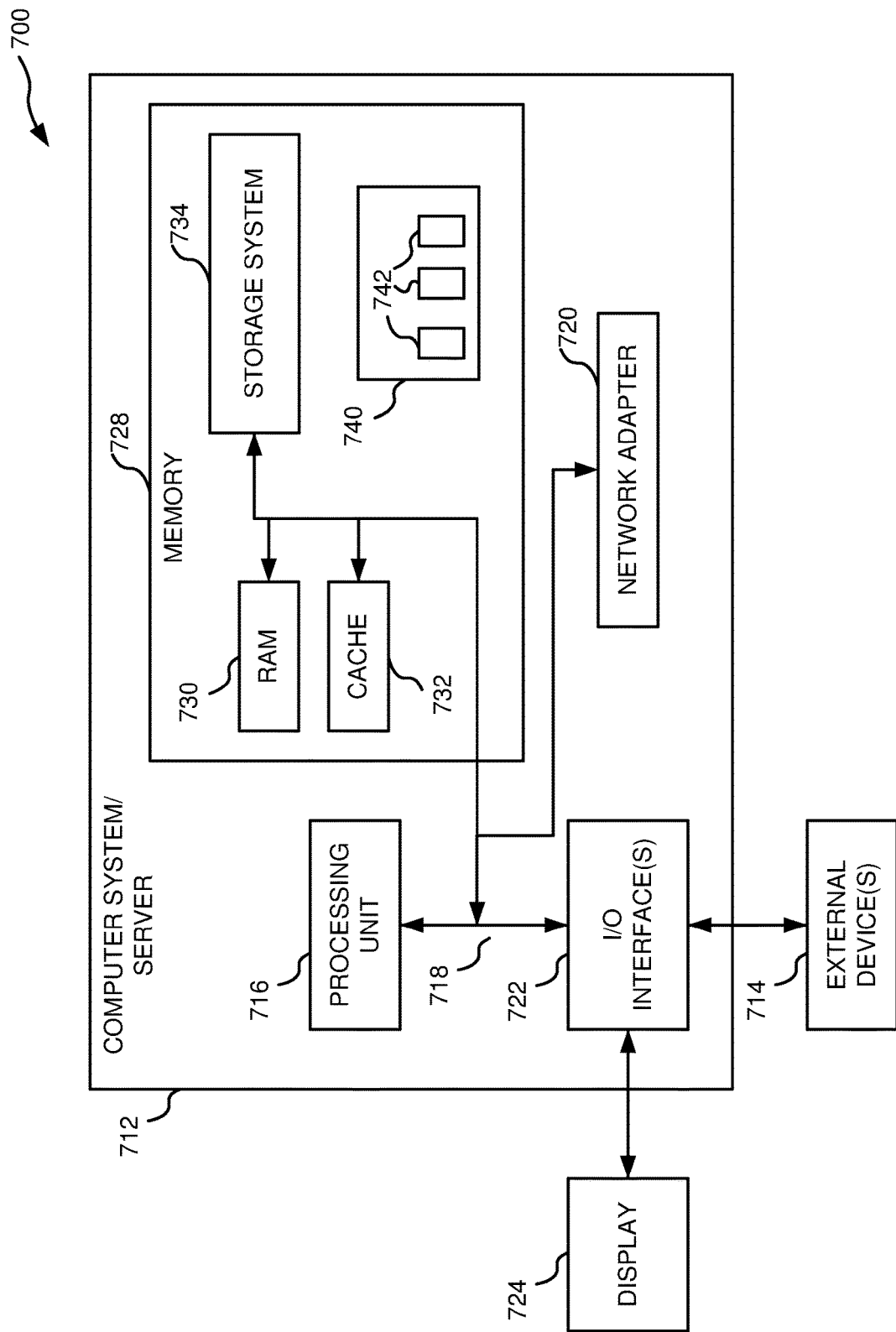
FIG. 7 depicts a computer system in accordance with an exemplary embodiment of the present invention.

In an exemplary embodiment, the computer system is a standalone computer system, such as computer system 700 shown in FIG. 7, a network of distributed computers, where at least some of the computers are computer systems such as computer system 700 shown in FIG. 7, or a cloud computing node server, such as computer system 700 shown in FIG. 7. In an embodiment, the computer system is a computer system 700 as shown in FIG. 7, that executes a monitoring service policy management script or computer software application that carries out the operations/steps of at least method 100. In an embodiment, the computer system is a computer system 700 as shown in FIG. 7, that executes a monitoring service policy management script or computer software application that carries out the operations of at least method 120. In an embodiment, the computer system is a computer system/server 712 as shown in FIG. 7, that executes a monitoring service policy management script or computer software application that carries out the operations of at least method 100. In an embodiment, the computer system is a computer system/server 712 as shown in FIG. 7, that executes a monitoring service policy management script or computer software application that carries out the operations of at least method 120. In an embodiment, the computer system is a processing unit 716 as shown in FIG. 7, that executes a monitoring service policy management script or computer software application that carries out the operations of at least method 100. In an embodiment, the computer system is a processing unit 716 as shown in FIG. 7, that executes a monitoring service policy management script or computer software application that carries out the operations of at least method 120.

In an embodiment, the computer system is a computer system 700 as shown in FIG. 7, that executes a monitoring service policy management script or computer software application that carries out at least operations/steps 104, 106, 108, 110, 112, 114, 116, and 118. In an embodiment, the computer system is a computer system 700 as shown in FIG. 7, that executes a monitoring service policy management script or computer software application that carries out at least operations 122, 124, and 126. In an embodiment, the computer system is a computer system/server 712 as shown in FIG. 7, that executes a monitoring service policy management script or computer software application that carries out at least operations/steps 104, 106, 108, 110, 112, 114, 116, and 118. In an embodiment, the computer system is a computer system/server 712 as shown in FIG. 7, that executes a monitoring service policy management script or computer software application that carries out at least operations 122, 124, and 126. In an embodiment, the computer system is a processing unit 716 as shown in FIG. 7, that executes a monitoring service policy management script or computer software application that carries out at least operations/steps 104, 106, 108, 110, 112, 114, 116, and 118. In an embodiment, the computer system is a processing unit 716 as shown in FIG. 7, that executes a monitoring service policy management script or computer software application that carries out at least operations 122, 124, and 126.

Refining Policy

Figure 3A:
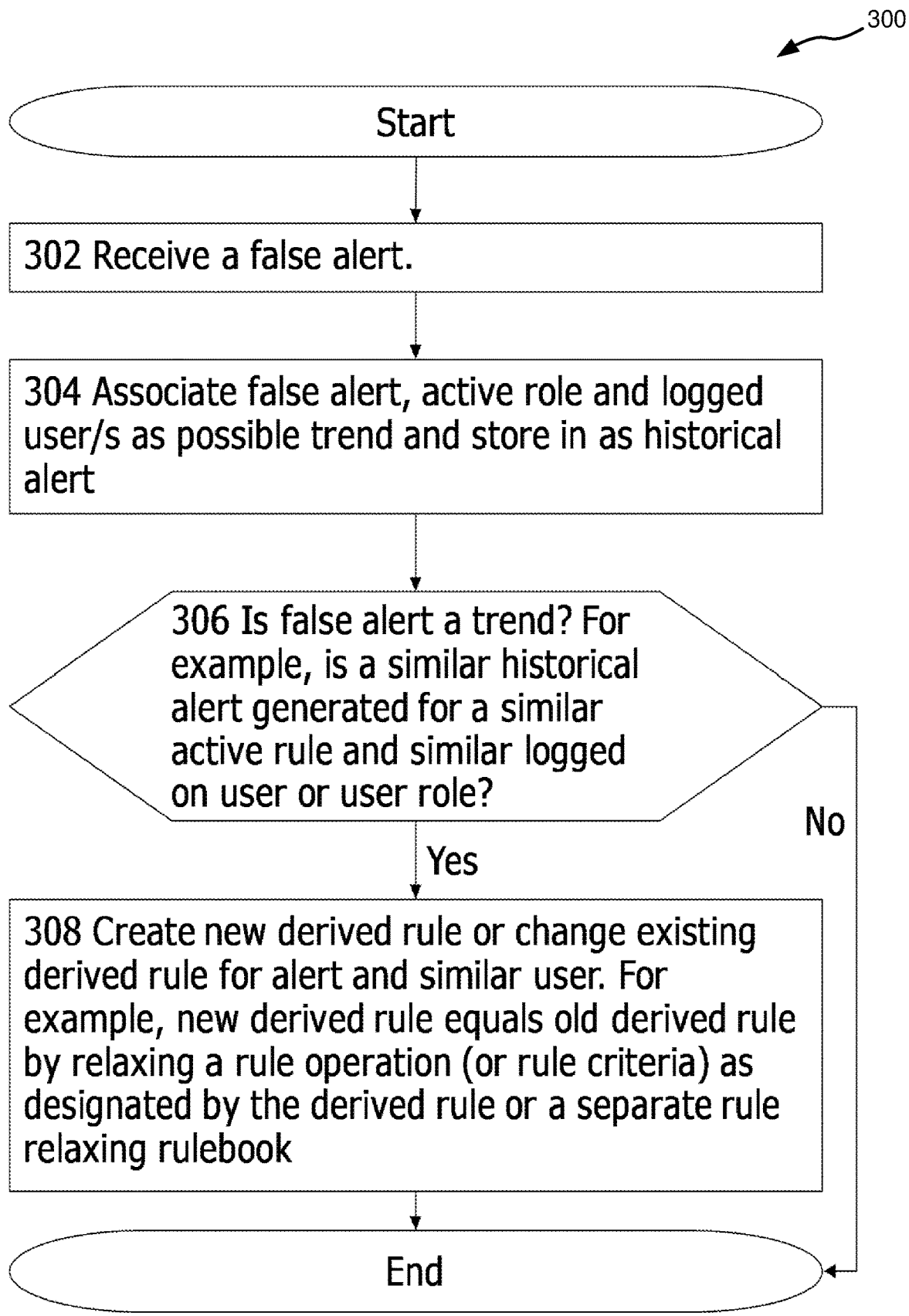
FIG. 3A depicts a flowchart in accordance with an embodiment of the present invention.

Referring to FIG. 3A, a flow diagram/flowchart of a policy refinement method 300 of the present embodiment is described. Policy refinement method 300 includes logical process steps 302 to 308. Policy refinement method 300 may operate independently, in serial, in combination or in parallel with team-based policy method 100. Although there is an order to the embodiment steps as described, the steps do not need to be in this order unless specified. In other embodiments, the steps could be in a different order.

Step 302 is for initiating the process/method when a false alert is received. A false alert is an alert that is flagged by a logged-on user or administrator as false (i.e., the alert generated by the monitoring service and deemed not needed (of little relevance) by a user). Step 304 is for associating the false alert, active rule and logged-on user as a possible trend. This can be accomplished by saving references together or tagging each with a possible trend tag. This step uses trend marker 208. The association is saved as an historical alert 260 that is marked or otherwise associated as false. Step 306 is for determining if the false alert is a trend. For example, by searching for similar possible trends having a similarly associated false alert, active rule and logged user. If it is so determined, then the process/method moves to step 308; otherwise, the process/method ends.

Step 308 is for creating a new user rule or amending an existing user rule when two or more possible trends are located (rule creator 212). A new user rule is created or an existing user rule is amended by relaxing a rule operation in an existing user rule. Relaxing a rule operation means that one or more rule operation criteria is decreased whereby the one or more rule operation criteria is defined such that decreasing value is a relaxation of the rule. Other embodiments could define relaxation as increasing the one or more criteria. By relaxing such rule criteria, it is intended that similar false alerts will not be generated in the future.

Creating New User Rule

Figure 3B:
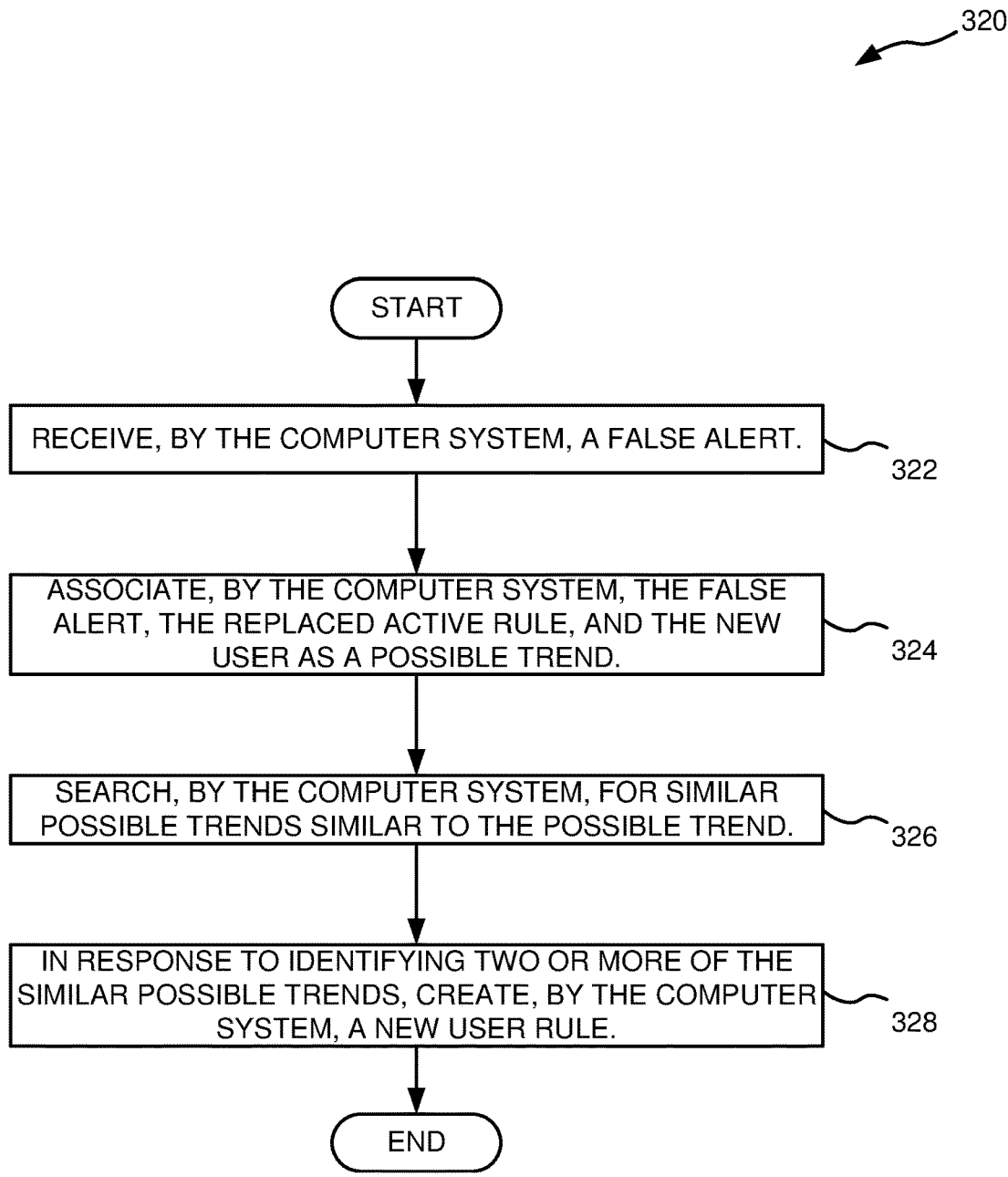
FIG. 3B depicts a flowchart in accordance with an embodiment of the present invention.

In a further embodiment, the computer implemented method, the system, and the computer program product further include (a) receiving, by the computer system, a false alert, (b) associating, by the computer system, the false alert, the replaced active rule, and the new user as a possible trend, (c) searching, by the computer system, for similar possible trends similar to the possible trend, and (d) in response to identifying two or more of the similar possible trends, creating, by the computer system, a new user rule. Referring to FIG. 3B, in a further embodiment, the present invention is further configured to perform an operation 322 of receiving, by the computer system, a false alert, an operation 324 of associating, by the computer system, the false alert, the replaced active rule, and the new user as a possible trend, an operation 326 of searching, by the computer system, for similar possible trends similar to the possible trend, and an operation 328 of in response to identifying two or more of the similar possible trends, creating, by the computer system, a new user rule. In a particular embodiment, the false alert is an alert that is tagged by a user as false.

In an embodiment, the computer system is a computer system 700 as shown in FIG. 7, that executes a monitoring service policy management script or computer software application that carries out the operations/steps of at least method 300. In an embodiment, the computer system is a computer system 700 as shown in FIG. 7, that executes a monitoring service policy management script or computer software application that carries out the operations of at least method 320. In an embodiment, the computer system is a computer system/server 712 as shown in FIG. 7, that executes a monitoring service policy management script or computer software application that carries out the operations/steps of at least method 300. In an embodiment, the computer system is a computer system/server 712 as shown in FIG. 7, that executes a monitoring service policy management script or computer software application that carries out the operations of at least method 320. In an embodiment, the computer system is a processing unit 716 as shown in FIG. 7, that executes a monitoring service policy management script or computer software application that carries out the operations/steps of at least method 300. In an embodiment, the computer system is a processing unit 716 as shown in FIG. 7, that executes a monitoring service policy management script or computer software application that carries out the operations of at least method 320.

In an embodiment, the computer system is a computer system 700 as shown in FIG. 7, that executes a monitoring service policy management script or computer software application that carries out at least operations/steps 302, 304, 306, and 308. In an embodiment, the computer system is a computer system 700 as shown in FIG. 7, that executes a monitoring service policy management script or computer software application that carries out at least operations 322, 324, 326, and 328. In an embodiment, the computer system is a computer system/server 712 as shown in FIG. 7, that executes a monitoring service policy management script or computer software application that carries out at least operations/steps 302, 304, 306, and 308. In an embodiment, the computer system is a computer system/server 712 as shown in FIG. 7, that executes a monitoring service policy management script or computer software application that carries out at least operations 322, 324, 326, and 328. In an embodiment, the computer system is a processing unit 716 as shown in FIG. 7, that executes a monitoring service policy management script or computer software application that carries out at least operations/steps 302, 304, 306, and 308. In an embodiment, the computer system is a processing unit 716 as shown in FIG. 7, that executes a monitoring service policy management script or computer software application that carries out at least operations 322, 324, 326, and 328.

In an exemplary embodiment, the creating includes relaxing a rule operation in an existing user rule. In an embodiment, creating operation 328 includes relaxing a rule operation in an existing user rule. In a further embodiment, the creating further includes (a) receiving, by the computer system, a notification when the new user logs out of the target network, (b) in response to receiving the notification, fetching, by the computer system, the replaced active rule, and (c) replacing, by the computer system, the fetched user rule in the network monitoring service with the fetched replaced active rule such that the monitoring service is configured to use the fetched replaced active rule for monitoring network events instead of the fetched user rule. In an embodiment, creating operation 328 further includes (a) receiving, by the computer system, a notification when the new user logs out of the target network, (b) in response to receiving the notification, fetching, by the computer system, the replaced active rule, and (c) replacing, by the computer system, the fetched user rule in the network monitoring service with the fetched replaced active rule such that the monitoring service is configured to use the fetched replaced active rule for monitoring network events instead of the fetched user rule. In a particular embodiment, the rule includes one or more sub-rules. In a particular embodiment, the new user is associated with a role, and the rule is associated with the role. In a particular embodiment, the target network includes a plurality of network devices, and the rule can be applied to any of the network devices.

Amending Existing User Rule

Figure 3C:
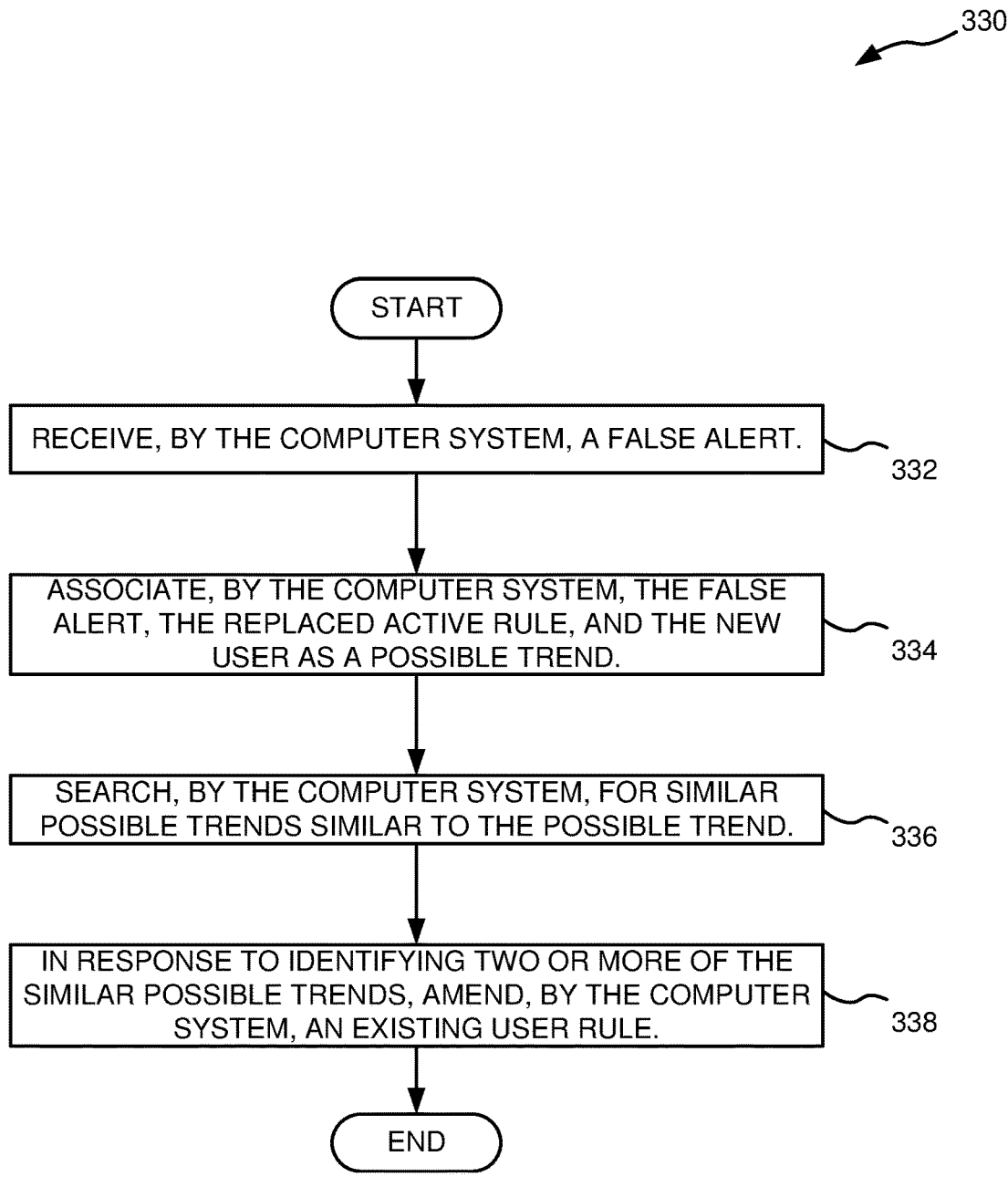
FIG. 3C depicts a flowchart in accordance with an embodiment of the present invention.

In a further embodiment, the computer implemented method, the system, and the computer program product further include (a) receiving, by the computer system, a false alert, (b) associating, by the computer system, the false alert, the replaced active rule, and the new user as a possible trend, (c) searching, by the computer system, for similar possible trends similar to the possible trend, and (d) in response to identifying two or more of the similar possible trends, amending, by the computer system, an existing user rule. Referring to FIG. 3C, in a further embodiment, the present invention is further configured to perform an operation 332 of receiving, by the computer system, a false alert, an operation 334 of associating, by the computer system, the false alert, the replaced active rule, and the new user as a possible trend, an operation 336 of searching, by the computer system, for similar possible trends similar to the possible trend, and an operation 338 of response to identifying two or more of the similar possible trends, amending, by the computer system, an existing user rule. In a particular embodiment, the false alert is an alert that is tagged by a user as false.

In an embodiment, the computer system is a computer system 700 as shown in FIG. 7, that executes a monitoring service policy management script or computer software application that carries out the operations of at least method 330. In an embodiment, the computer system is a computer system/server 712 as shown in FIG. 7, that executes a monitoring service policy management script or computer software application that carries out the operations of at least method 330. In an embodiment, the computer system is a processing unit 716 as shown in FIG. 7, that executes a monitoring service policy management script or computer software application that carries out the operations of at least method 330.

In an embodiment, the computer system is a computer system 700 as shown in FIG. 7, that executes a monitoring service policy management script or computer software application that carries out at least operations 332, 334, 336, and 338. In an embodiment, the computer system is a computer system/server 712 as shown in FIG. 7, that executes a monitoring service policy management script or computer software application that carries out at least operations 332, 334, 336, and 338. In an embodiment, the computer system is a processing unit 716 as shown in FIG. 7, that executes a monitoring service policy management script or computer software application that carries out at least operations 332, 334, 336, and 338.

In an exemplary embodiment, the amending includes relaxing a rule operation in an existing user rule. In an embodiment, amending operation 338 includes relaxing a rule operation in an existing user rule. In a further embodiment, the amending further includes (a) receiving, by the computer system, a notification when the new user logs out of the target network, (b) in response to receiving the notification, fetching, by the computer system, the replaced active rule, and (c) replacing, by the computer system, the fetched user rule in the network monitoring service with the fetched replaced active rule such that the monitoring service is configured to use the fetched replaced active rule for monitoring network events instead of the fetched user rule. In an embodiment, amending operation 338 further includes (a) receiving, by the computer system, a notification when the new user logs out of the target network, (b) in response to receiving the notification, fetching, by the computer system, the replaced active rule, and (c) replacing, by the computer system, the fetched user rule in the network monitoring service with the fetched replaced active rule such that the monitoring service is configured to use the fetched replaced active rule for monitoring network events instead of the fetched user rule. In a particular embodiment, the rule includes one or more sub-rules. In a particular embodiment, the new user is associated with a role, and the rule is associated with the role. In a particular embodiment, the target network includes a plurality of network devices, and the rule can be applied to any of the network devices.

Example

Referring to FIG. 4, a team-based policy system 400 deployment is described connected to monitoring service 410 and target network 420 (also known as a monitored network). Target network 420 includes a cluster of systems, for example, S1, S2, S3, and S4. For example, users, for example 1A, 1B, and 1C could access the systems for management purposes. Users 1B and 1C could have role 1 (for example a developer role). An operator, for example 1A, could access the systems to apply a patch, while developers 1B and 1C could access the systems to debug an error. Another user could access the systems to read or adjust data.

As a further example, monitoring service 410 could monitor the cluster to send alerts if any systems in the cluster, or the cluster itself, becomes unhealthy. The alerting could be based on monitoring criteria breaching thresholds set by an active policy of monitoring service 410. Monitoring service 410 could operate on a separate platform and in a separate environment from target network 420. Monitoring workload could have a minimum impact on the workload of target network 420 in order to maximize the reliability of the monitoring.

Also, for example, a further user 2, could receive alerts from monitoring service 410 and could flag one or more alerts as false. False alerts could be sent to team-based policy system 400. User 2 could be an independent user or any one of 1A, 1B and 1C. A false alert could be an alert which is of deemed of little relevance to one or more users.

For example, team-based policy system 400 could observe a user accessing a cluster. Team-based policy system 400 could look up the accessing user in team database 254 to identify the team and/or role, the primary policy associated to the systems being accessed and the team-specific derivative policy. If the team in question were to have a team-specific monitoring policy for the current primary policy, this new derivative policy could be pushed into monitoring service 410 to temporarily replace the active policy for those systems. The derivative policy could change the criteria defining when alerts should be triggered. When the users log out of the system, the original primary policy could be restored to monitoring service 410. If a user of a different team were to access the system at the same time, a further derivative rule or policy could be pushed into monitoring service 410. The further derivative rule or policy could be checked against the existing derivative rule for conflict, and conflict resolution could be taken if so located.

The present invention could avoid false alerting due to expected user activity where this user activity could cause the system to exceed the standard policy thresholds but still be "normal" when considering what the user is doing. The present invention could also reduce the effort needed to maintain the policies over time, and could eliminate the need for the accessing user to manually change the active alerting rules based on the actions they are about to perform.

Referring to FIG. 5A, an example primary policy and derived policy are shown side by side for comparison. For example, primary policyP is for clusterS in FIG. 4 and clusterT and includes (or references) two rules: cpuR and nodeDownR. In a further example, policyP includes the following instructions:

```
"policyP": {
    "clusters": ["clusterS", "clusterT"],
    "metrics": [
        {
            "name": "cpuR",
        },
        {
            "ruleName": "nodeDownR",
        },
        ...
    ]
}
```

For example, derived policyP1 is for clusters clusterS and clusterT again and includes two different rules albeit derived from the other rules cpuR1 and nodeDownR1. In a further example, policyP1 includes the following instructions:

```
"policyP1": {
    "clusters": ["clusterS", "clusterT"],
    "metrics": [
        {
            "ruleName": "cpuR1",
        },
        {
            "ruleName": "nodeDownR1",
        },
        ...
    ]
}
```

In the example described in FIG. 5A, the derived part of policyP1 is that it references derived rules cpuR1 and nodeDownR1 derived from cpuR and nodeDownR.

Referring to FIG. 5B, an example comparison for cpuR and cpuR1 rules for each of the primary policy and derived policy for the present example is shown. For example, instructions for cpuR include the following:

```
"ruleName": "cpuR"
"metricScale": "server",
    "metric": "cpu",
    "alertCondition": "greaterThan",
    "alertValue": "85",
    "relaxRule": {
        "operation": "subtract",
        "value": "35"
    }
```

"metricScale": "server" instructs the monitoring service to apply this rule individually to each server in the cluster. "alertCondition": "greaterThan", "alertValue": "85" instructs the monitoring service to create an alert whenever alertCondition is greater than 85. "relaxRule": {"operation": "subtract", "value": "35"} instructs the policy refinement service 300 to subtract the value 35 from the alertValue when it comes to relaxing the rule. "cpuR1" is an example of a derived rule after policy refinement method has relaxed the original rule such that the main difference is that "alertCondition" is now "greaterThan", "alertValue": "50" after the subtraction operation. The derived rule defines that an alert be created whenever alertCondition is greater than 50. In the example described in FIG. 5B, the rule has been derived by relaxing the operation by subtracting 35 from the alertValue, and 85 subtract 35 is 50 as shown in bold for the corresponding rule cpuR1.

Referring to FIG. 5C, a comparison of nodeDownR and nodeDownR1 for Primary policy and Derived policyP1 for the present example is shown. For example, instructions for nodeDownR include:

```
"ruleName": "nodeDownR",
"metricScale": "cluster", //This rule is applied to the cluster
as a whole
"metric": "portTest",
"port": "8080",
"alertCondition": "greaterThan",
"alertValue": "4",
"relaxRule": {
    "operation": "subtract",
    "value": "1"
}
```

"metricScale": "cluster" instructs the monitoring service to apply the rule to the cluster as a whole. "metric": "portTest", "port": "8080" is the metric that is monitored. "alertCondition": "greaterThan", "alertValue": "4" instructs the monitoring service that there are 4 servers in the cluster, where all four servers must be responsive on the port. "relaxRule": {"operation": "subtract", "value": "1"} instructs the policy refinement service 300 to subtract 1 from the alertValue. "nodeDownR1" is an example of a derived rule after policy refinement method 300 has relaxed the original rule nodeDown such that the main difference is that "alertCondition" is now "greaterThan", "alertValue": "3" after the relaxing operation. The policy now states that only 3 servers must be responsive on port 8080, which means a temporary outage of a single server is tolerated and no false alerts will be fired as servers are restarted in a rolling fashion.

Referring to FIG. 5D, an example set of roles for the present example is shown. For example, if a user john.smyth, whose role is role1, were to access the system to apply a patch and accesses the cluster. By default, policyP is applied but as role1 has policyP1 defined a derived policy, then the policy is replaced with policyP1 when john.smyth or alvis.thompson or anyone else defined in that role logs in. The rules and derivative policies are defined below:

```
"roles" :[
   "role1": {
      "members": ["john.smyth", "alvis.thompson"],
      "derivitivePolicies": [
         "policyP" : "policyP1",
         "policyQ" : "policyQ4",
         ...
      ]
   },
   ...
]
```

Since the first code block shows us that policyP is associated to clusterS, and role1 has a derivative policy of policyP1 associated to policyP, policyP1, for example, is published to the monitoring service to replace policyP for clusterS while john.smyth is logged into the system.

Figure 6:
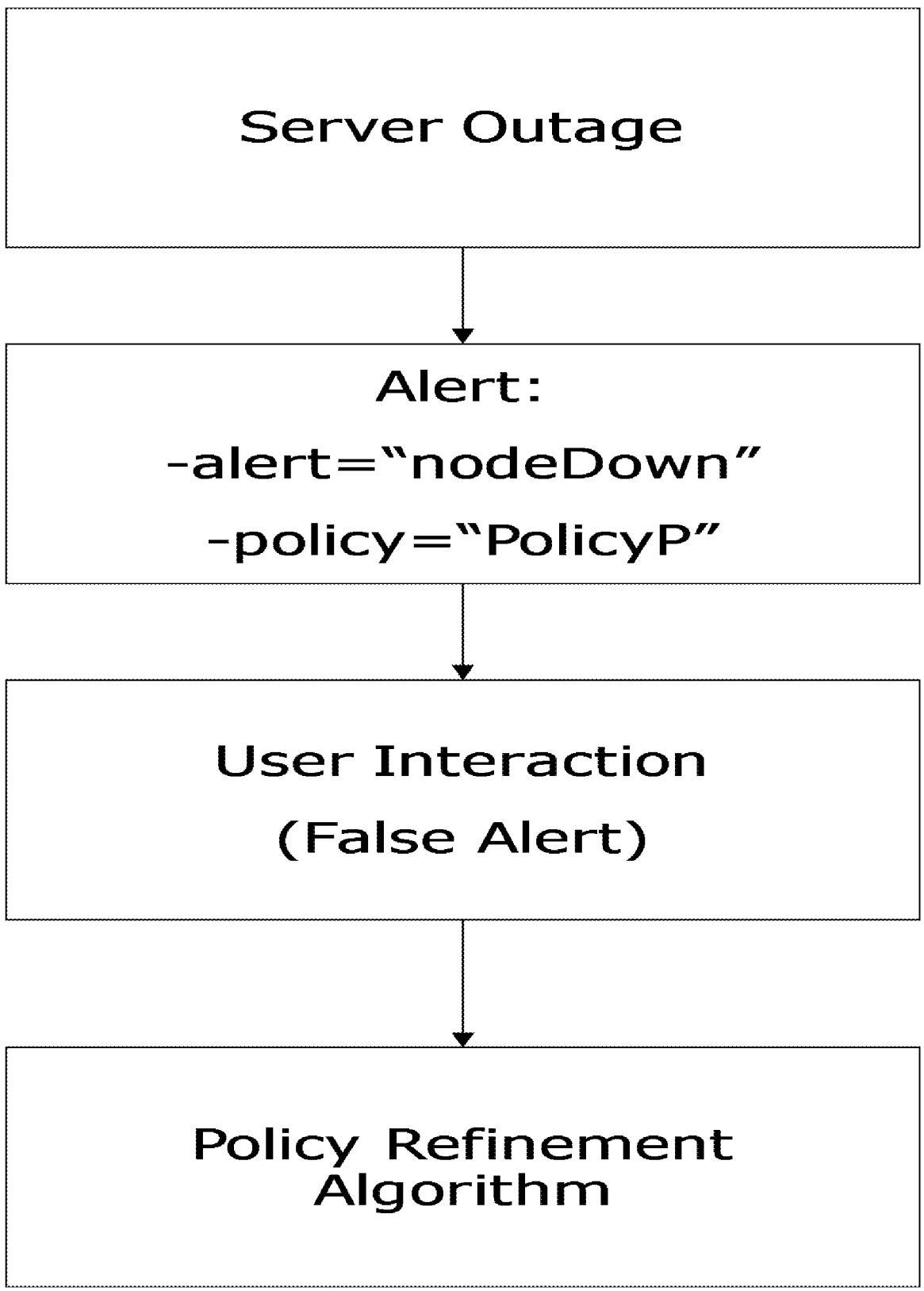
FIG. 6 depicts a flowchart in accordance with an embodiment of the present invention.

Referring to FIG. 6, an example of the present invention whereby a server is detected as down by the monitoring system is shown. For example, detecting that a server is down spawns an alert with the following details:

```
"alert":{
   "alert": "nodeDown"
   "policy": "PolicyP"
}
```

The nodeDown alert of policyP is defined as the following:

```
{
   "name": "nodeDown",
   "metricScale": "cluster", //This rule is applied
   to the cluster as a whole
   "metric": "portTest",
   "port": "8080",
   "alertCondition": "greaterThan",
   "alertValue": "4", // There are 4 servers in the cluster.
   All 4 must be responsive on the port
   "relaxRule": {
      "operation": "subtract",
      "value": "1"
   }
}
```

As a further example, a user would then log into the monitoring system to flag the alert to be false. The act of marking a policy as false triggers policy refinement algorithm 300. For example, policy refinement algorithm 300 could then examine the rules associated with the policy, and based upon previous user interaction, could attempt to identify a trend of false alerting for the currently logged-on team. If policy refinement algorithm 300 were to identify that this trend exists, policy refinement algorithm 300 could derive a refined alerting policy for the current team based upon the operation and value defined by the relaxRule section of the original alerting rule. This policy could then be associated only with the user's team which was accessing the system when the pattern of alerts was triggered. The new policy could replace the default policy for any duration in which the users team accesses a system which is associated with the policy that has been refined. If any future further refinement were to occur for this team or policy, the future further refinement could be a further refinement of already derived policy.

In an example, the team based policy manager is maintaining a mapping of team roles to derivative policies as shown:

```
"roles" :[
   "role1": {
      "members": ["john.smyth", "alvis.thompson"],
      "derivitivePolicies": [
         "policyP" : "policyP1",
         "policyQ" : "policyQ4",
         ...
      ]
   },
   ...
]
```

If role1 did not have a derivative policy of PolicyP, it would now be created. If role1 already had a derivative policy, it would execute the refinement against the derivative, and the result would be the new derivative policy. For example, the new refined policy now appears as:

```
{
   "name": "nodeDown",
   "metricScale": "cluster", //This rule is applied to
   the cluster as a whole
   "metric": "portTest",
   "port": "8080",
   "alertCondition": "greaterThan",
   "alertValue": "3", // There are 4 servers in the
   cluster. 1 can be down
   "relaxRule": {
      "operation": "subtract",
      "value": "1"
   }
}
```

A simple version of policy refinement algorithm 300 could be:

```
falseAlertRefinementThreshold = 3
if not falseAlerts[accessingTeam]:
   falseAlerts[accessingTeam] = { }
if not falseAlerts[accessingTeam][alert.policy]:
   falseAlerts[accessingTeam][alert.policy] = { }
if not falseAlerts[accessingTeam][alert.policy][alert.alert]:
   falseAlerts[accessingTeam][alert.policy][alert.alert] = 0
falseAlerts[accessingTeam][alert.policy][alert.alert] += 1
if falseAlerts[accessingTeam][alert.policy][alert.alert] >=
falseAlertRefinementThreshold:
   relaxPolicy(accessingTeam, alert.policy, alert.alert)
   falseAlerts[accessingTeam][alert.policy][alert.alert] = 0
```

Policy refinement algorithm 300 could execute the relaxPolicy function if it were to identify that 3 of the same false alerts for the same team. The relax policy could then create a refined policy for that team and store it within the database. This refined policy could then be used if the team were to access the system in the future and could reset the false alerts count for this alert and team back to 0 such that if this refined algorithm were found to be requiring more refinement, this requirement could be identified using the same algorithm.

Computer System

In an exemplary embodiment, the computer system is a computer system 700 as shown in FIG. 7. Computer system 700 is only one example of a computer system and is not intended to suggest any limitation as to the scope of use or functionality of embodiments of the present invention. Regardless, computer system 700 is capable of being implemented to perform and/or performing any of the functionality/operations of the present invention.

Computer system 700 includes a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 712 may be described in the general context of computer system-executable instructions, such as program modules, being executed by a computer system. Generally, program modules may include routines, programs, objects, components, logic, and/or data structures that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in computer system 700 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 712 typically includes a variety of computer system readable media. Such media may be any available media that is accessible by computer system/server 712, and includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions/operations of embodiments of the invention.

Program/utility 740, having a set (at least one) of program modules 742, may be stored in memory 728 by way of example, and not limitation. Exemplary program modules 742 may include an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the present invention.

Computer system/server 712 may also communicate with one or more external devices 714 such as a keyboard, a pointing device, a display 724, one or more devices that enable a user to interact with computer system/server 712, and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
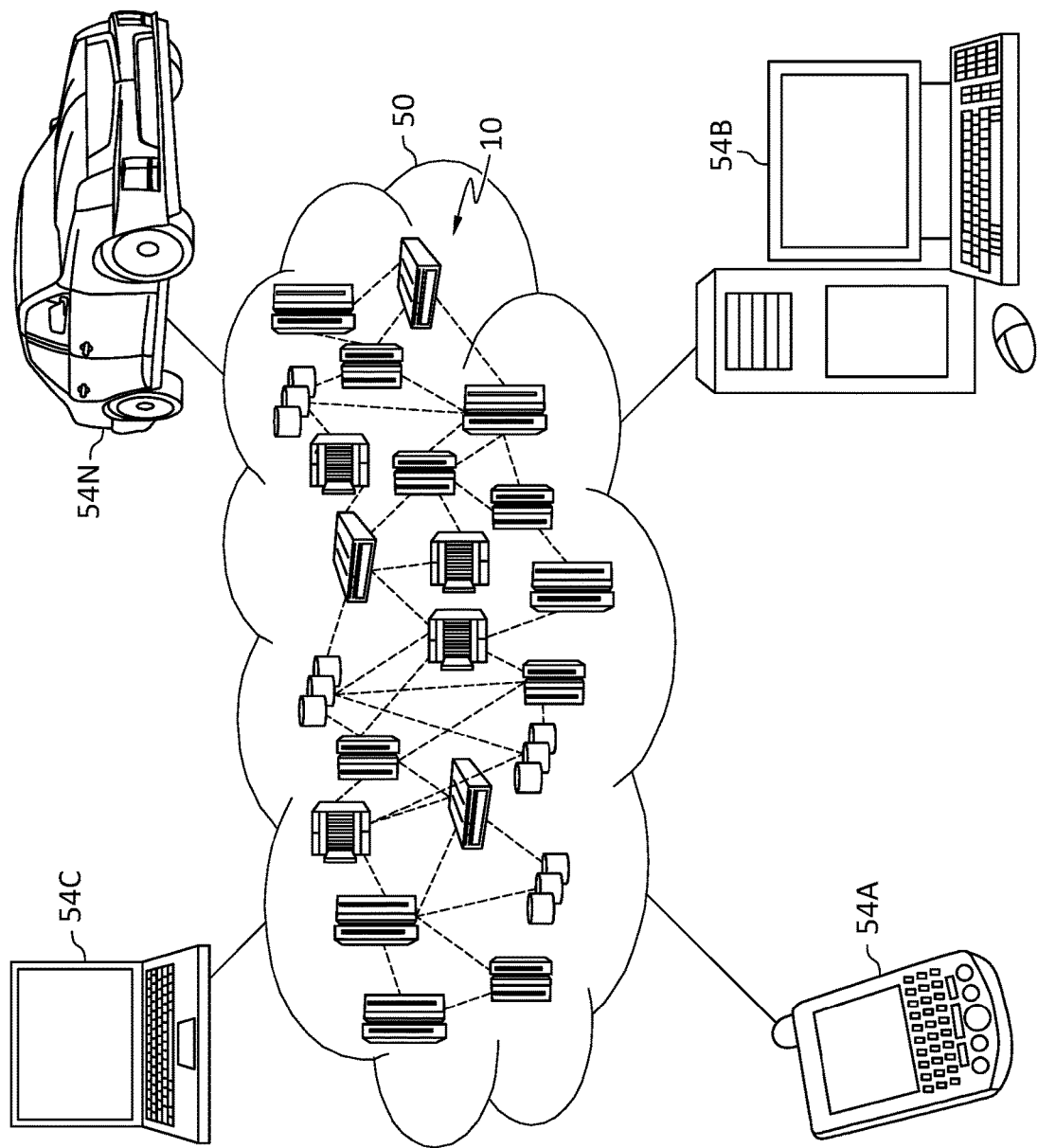
FIG. 8 depicts a cloud computing environment according to various embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
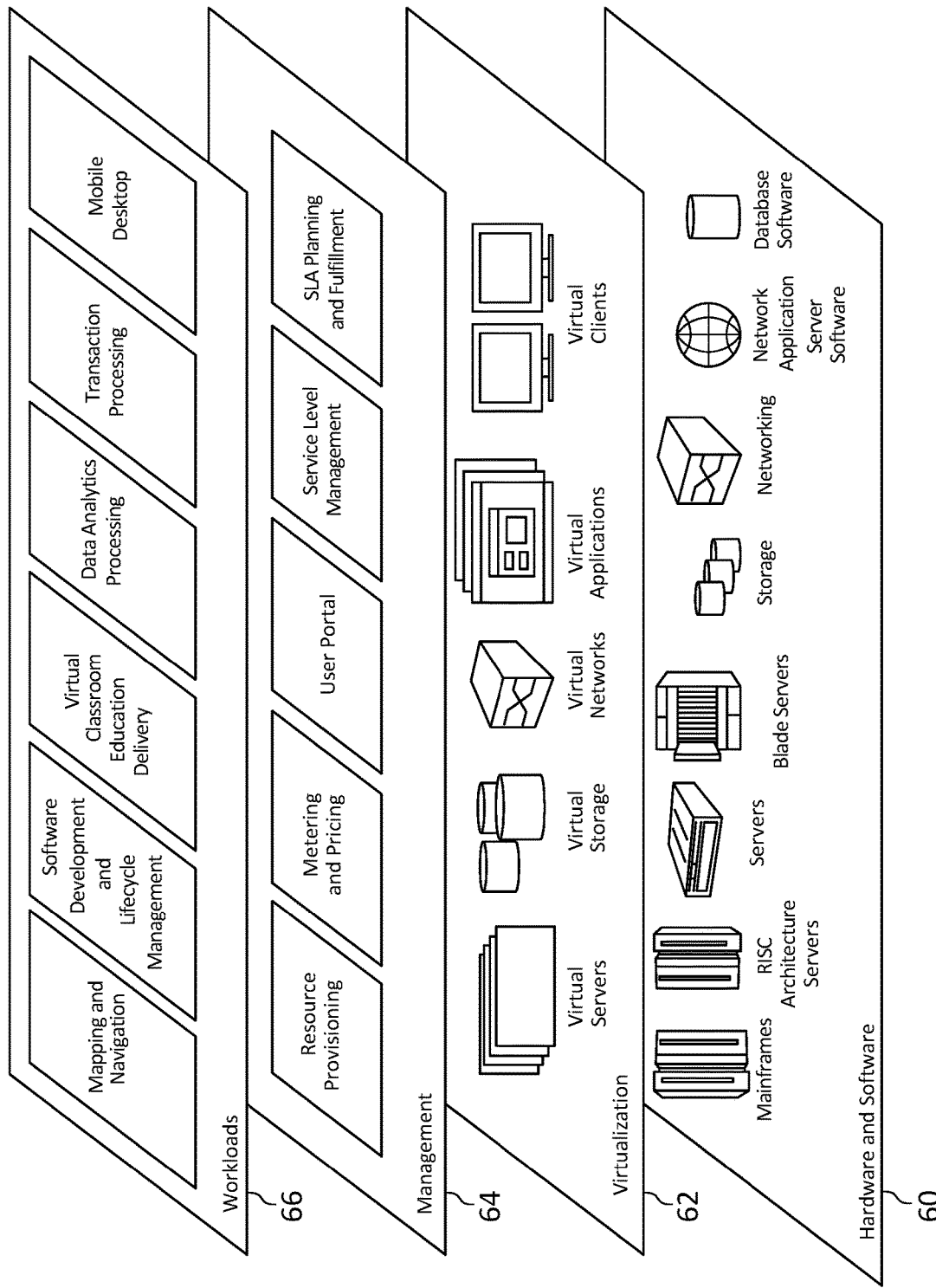
FIG. 9 depicts abstraction model layers according to various embodiments of the present invention.

Referring now to FIG. 9, a set of functional abstraction layers provided by cloud computing environment 50 is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method comprising:
receiving, by a computer system, a user-id when a new user logs onto a target network;
in response to the receiving:
fetching, by the computer system, a fetched rule associated with the new user;
replacing, by the computer system, an active rule in a network monitoring service with the fetched rule such that the fetched rule, instead of the replaced active rule, is used throughout the target network while the new user is logged onto the target network to monitor network events and to create an alert;
wherein: the target network comprises a plurality of network devices, and the fetched rule is applicable to the plurality of the network devices and other users;
the computer implemented method further comprising:
receiving, by the computer system, a false alert;
associating, by the computer system, the false alert, the replaced active rule, and the new user as a trend;
searching, by the computer system, for similar trends, having a similarly associated false alert, active rule and the new user, similar to the trend; and
in response to identifying two or more of the similar trends, amending, by the computer system, an existing user rule.

2. The computer implemented method of claim 1 further comprising:
receiving, by the computer system, a false alert;
associating, by the computer system, the false alert, the replaced active rule, and the new user as a trend;
searching, by the computer system, for similar trends, having a similarly associated false alert, active rule and the new user, similar to the trend; and
in response to identifying two or more of the similar trends, creating, by the computer system, a new user rule.

3. The computer implemented method of claim 2 wherein the creating comprises relaxing a rule operation in an existing user rule.

4. The computer implemented method of claim 3 further comprising:
receiving, by the computer system, a notification when the new user logs out of the target network;
in response to receiving the notification, fetching, by the computer system, the replaced active rule; and
replacing, by the computer system, the fetched user rule in the network monitoring service with the fetched replaced active rule such that the fetched replaced active rule is used for monitoring network events instead of the fetched user rule.

5. The computer implemented method of claim 4 wherein a rule comprises one or more sub-rules.

6. The computer implemented method of claim 5 wherein the new user is associated with a role, and wherein the rule is associated with the role.

7. The computer implemented method of claim 2 wherein the false alert is an alert that is tagged by a user as false.

8. The computer implemented method of claim 1 wherein the amending comprises relaxing a rule operation in the existing user rule.

9. The computer implemented method of claim 8 further comprising:
receiving, by the computer system, a notification when the new user logs out of the target network;
in response to receiving the notification, fetching, by the computer system, the replaced active rule; and
replacing, by the computer system, the fetched user rule in the network monitoring service with the fetched replaced active rule such that the fetched replaced active rule is used for monitoring network events instead of the fetched user rule.

10. The computer implemented method of claim 9 wherein a rule comprises one or more sub-rules.

11. The computer implemented method of claim 10 wherein the new user is associated with a role, and wherein the rule is associated with the role.

12. The computer implemented method of claim 1 wherein the false alert is an alert that is tagged by a user as false.

13. A system comprising:
a memory; and
a processor in communication with the memory, the processor configured to:
receive a user-id when a new user logs onto a target network;
in response to the receipt: fetch a fetched rule associated with the new user;
replace an active rule in a network monitoring service with the fetched rule such that the fetched rule, instead of the replaced active rule, is used throughout the target network while the new user is logged onto the target network to monitor network events and to create an alert;
wherein: the target network comprises a plurality of network devices, and the fetched rule is applicable to the plurality of the network devices and other users;
wherein the processor is further configured to:
receive a false alert;
associate the false alert, the replaced active rule, and the new user as a trend;
search for similar trends, having a similarly associated false alert, active rule and the new user, similar to the trend; and
in response to an identification of two or more of the similar trends, create a new user rule.

14. The system of claim 13 wherein the creation comprises causing the processor to relax a rule operation in an existing user rule.

15. A computer program product comprising a computer readable storage medium having program instructions embodied therewith, the program instructions executable by a processor to:
receive a user-id when a new user logs onto a target network;
in response to the receipt:
fetch a fetched rule associated with the new user;
replace an active rule in a network monitoring service with the fetched rule such that the fetched rule, instead of the replaced active rule, is used throughout the target network while the new user is logged onto the target network to monitor network events and to create an alert;

wherein:
the target network comprises a plurality of network devices, and the fetched rule is applicable to the plurality of the network devices and other users;
wherein the instructions further cause the processor to:
receive a false alert;
associate the false alert, the replaced active rule, and the new user as a trend;
search for similar trends, having a similarly associated false alert, active rule and the new user, similar to the trend; and
in response to the identification of two or more of the similar trends, create a new user rule.

* * * * *